UNITED STATES PATENT OFFICE.

JONATHAN MOSTELLER, OF LOCK HAVEN, PENNSYLVANIA.

IMPROVED CEMENT FOR ROOFING AND FOR OTHER PURPOSES.

Specification forming part of Letters Patent No. 35,464, dated June 3, 1862.

*To all whom it may concern:*

Be it known that I, JONATHAN MOSTELLER, of Lock Haven, in the county of Clinton and State of Pennsylvania, have invented a new and Improved Fire-Proof Cement or Composition for Roofing, Paving, or for Covering the Outside of Buildings; and I do hereby declare that the following is a full and exact description thereof.

I first cover over the roof of a building of boards, shingles, tin, or sheeting with a thin coating of pitch-tar, which is for the purpose of making my composition or mixture stick and adhere to the roof.

I mix the following ingredients to compose my composition or cement, to wit: sand, gravel, fine iron ore, iron-ore clay, common cement usually used for plastering cisterns, fire-brick clay, yellow ocher, red lead, gum-shellac, gas-tar, linseed-oil, and pitch-tar, in the following mode and manner, to wit: To one gallon of gas-tar I add one pound of red lead, a half-pound of shellac dissolved in a mixture of equal parts of benzole and linseed-oil, and one quart of freshly-slaked lime. I boil this mixture well together, and add and mix with it equal parts of the iron ore, iron-ore clay, fire-brick clay, the common cement, sand, and gravel, and mix them well together as a stiff cement, and apply this composition, thin and smooth, to the roof of a building, one-quarter of an inch thick, and upon railway-cars an eighth of an inch thick, making a very light and safe covering, which I smooth over evenly with a plasterer's trowel. I then use the yellow ocher, iron ore, and fire-brick clay in quantities to suit the color desired, ground finely, and with a sieve scatter and cover over the cement, to color the whole a neat drab or grayish color, which colors do not attract the sun's rays as strongly as the red and black colors commonly used for roofing purposes. I finish it by pressing it smoothly solid with a roller, which prevents the cement from melting and running off, prevents the frost or atmosphere from taking effect upon it, and allows the rain to run off rapidly.

The advantages of my composition or cement are that I secure a building permanently fire-proof, with a very light covering, scarcely any weight to the building, and which will last for many years. I also put this composition on in one coating, saving time, labor, and expense, and a fine finish and color are also at the same time given to the roof.

What I claim as my invention, and desire to secure by Letters Patent, is—

The combination of the above-mentioned ingredients, with the mode and manner of applying and coloring the same, substantially as described, and for the purposes set forth.

May 23, 1862.

JONATHAN MOSTELLER.

Witnesses:
I. FRANKLIN REIGART,
JOHN S. HOLLINGSHEAD.